Oct. 3, 1944.  E. M. S. McWHIRTER ET AL  2,359,572
ELECTRIC TESTING ARRANGEMENT
Filed March 24, 1943
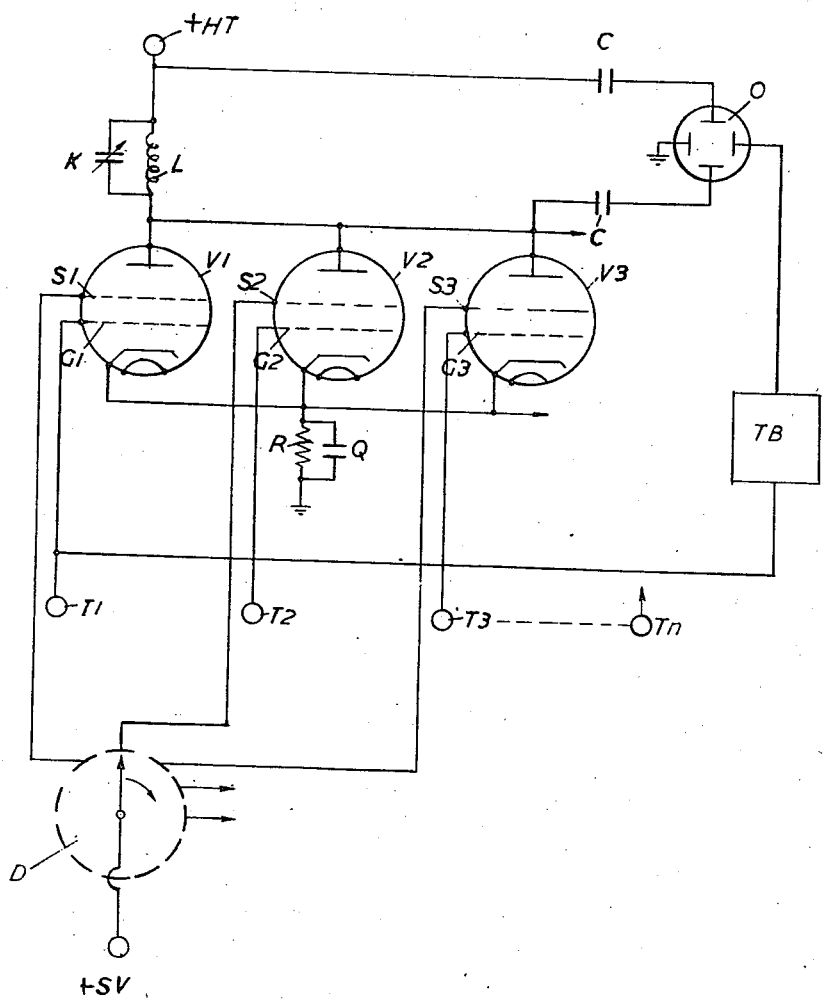
Inventor
Eric Malcolm Swift McWhirter
Roland Harradum
By
George J Hyde
Attorney Patented Oct. 3, 1944

2,359,572

UNITED STATES PATENT OFFICE 2,359,572

ELECTRIC TESTING ARRANGEMENT

Eric Malcolm Swift McWhirter and Roland Harris Dunn, London, England, assignors to Standard Telephones and Cables Limited, London, England, a company of Great Britain Application March 24, 1943, Serial No. 480,315 In Great Britain May 29, 1942

5 Claims. (Cl. 171—95)

The present invention relates to arrangements for obtaining multiple traces on an oscilloscope, particularly for the purpose of studying the wave-forms of multi-phase high frequency generators.

When studying the output wave-forms of multi-phase generators it is desirable to be able to view simultaneously the various phases in their actual relation on the screen of a cathode ray oscilloscope. The present invention provides a method by which an oscilloscope with the usual two pairs of deflecting plates can be used to give several simultaneous traces. While it is of special interest to obtain three traces for observing three-phase systems, the principles are the same for any number of phases. The arrangement of the invention is particularly suitable as an aid in the adjustment of multi-phase oscillators. It is however more generally applicable for obtaining traces on a single oscilloscope corresponding to any number of different phenomena which may or may not be related.

According to the invention, there is provided an arrangement for obtaining multiple traces on the screen of a cathode-ray oscilloscope having a pair of deflecting plates connected across a load impedance, comprising two or more thermionic valves having their plates connected in parallel to the load impedance, the valves being normally in a blocked condition, and means for periodically unblocking the valves in turn one at a time, whereby a trace is obtained on the oscilloscope screen corresponding to a varying voltage applied to the control grid of each unblocked valve.

The invention will be more clearly understood from the detailed description which follows, which refers to the accompanying drawing showing a schematic circuit diagram of an embodiment of the invention.

Referring to the drawing, any number of similar valves (of which only three are shown) $V_1$, $V_2$, $V_3$, etc., have their plates connected in parallel through a common anti-resonant circuit K, L to the positive terminal of the high tension supply. The cathodes are connected to a common biasing resistance R shunted by a by-pass condenser Q. The control grids $G_1$, $G_2$, $G_3$, etc., of the valves are separately connected to corresponding terminals $T_1$, $T_2$, $T_3$, etc., to which the separate phases of the generator to be inspected are connected. A cathode ray oscilloscope shown conventionally at O has its vertically deflecting plates connected through blocking condensers C across the anti-resonant circuit which is tuned to the frequency of the generator. One of the horizontally deflecting plates of O is connected to earth and the other to a time base TB controlled from one of the phases, say No. 1, as shown.

The screen grids $S_1$, $S_2$, $S_3$, etc., are separately connected to the segments of a distributor D which connects them in turn to an appropriate polarising source $+SV$. It will be evident that the valves may be so biased as to be blocked except during the short periods when their screen grids are connected to the source SV. This is equivalent to connecting each of the phases in turn for a short period to the oscilloscope. Thus if the distributor rotates at a suitable speed, separate traces for all the phases will be seen simultaneously on the oscilloscope screen. The speed of the distributor is not of much importance, but it should be fast enough for the traces to appear continuous, but slow enough for several waves of each phase to be registered so that the trace does not appear broken up. Probably a speed of 30 to 50 rotations per second would be satisfactory unless the frequency of the generator is very low indeed.

It will be evident that use of the screen grids is only one way in which the valves may be unblocked. For example, the cathodes could be separately biased so that all the valves are normally beyond the cut off and the distributor could be used to short-circuit part of each biasing resistance in turn to unblock the corresponding valve. Any like method may be used.

Any kind of rotating distributor can be used: an automatic stepping switch with the banks of contacts appropriately multipled is suitable. Moreover the same result can be achieved by a closed chain of relays operating one another in turn in the well known way, each of which unblocks the corresponding valve. There are no critical requirements for the distributing arrangement, and the speed of operation does not need to be kept very constant.

The introduction of the valves is for the purpose of preventing the high frequency generator from being affected by the distributing arrangements. It is found that if the generator is connected directly to the distributor, its operation may in some cases be affected by the capacity variations which are produced by the operation of the distributor. By introducing the valves, each of the terminals T is connected only to a valve grid, and so long as the bias used in such that there is never any grid current, the impedance connected to the generator terminals is substantially only that of the grid capacity and does not vary. It will thus be evident that any unblocking arrangement used should not involve the valve grids, so that there will be no danger of affecting the generator.

If desired, the time base may be omitted and the oscilloscope plate may be connected directly to the first or other phase chosen. In this case the traces will consist of a number of easily recognisable loops, different for each phase. In order to avoid any reaction of the time base on the generator, at high frequencies, it may be desirable to include a valve amplifying stage between the terminal $T_1$ and the time base (or oscilloscope if the time base is omitted).

The valves $V_1$, $V_2$, $V_3$, etc., are shown as having indirectly heated cathodes, the heating arrangements being conventional and therefore not shown. This is however not essential, as valves with filamentary cathodes could be used if desired. The valves may be pentodes or of any other suitable type. Triodes could also be used if preferred, if some other unblocking arrangement not requiring a second grid be adopted such as has been suggested above.

The arrangement is applicable to obtain multiple traces corresponding to any simultaneously occurring phenomena not related to multiphase systems. In this case the tuned load impedance KL might not be appropriate, and a suitable resistance or other type of impedance could be used instead, and the plates if necessary could each be fed from the high tension source through a separate impedance in the well known way, if desired. In a case like this, also, the time base (if used) might preferably be synchronised or controlled quite imdependently of the phenomena being observed. Various other modifications of the circuit are also possible while retaining the main features of the invention.

What is claimed is:

1. Electric testing arrangement for multi-phase generators comprising a circuit including a plurality of normally blocked thermionic valves, each of said valves having therein a plate, a screen grid, a control grid and a cathode, a tuned load impedance to which the plates of said valves are connected in parallel, an oscilloscope containing a plurality of pairs of deflection plates one of said pairs being connected to the valve plates and to the said tuned load impedance, a high tension supply having a positive terminal connected through said tuned load impedance to said valve plates, valve unblocking means comprising a rotating distributor having contacts connected respectively to the screen grids of said valves and a rotating brush adapted to unblock each valve on engaging with the corresponding contact, and terminals connected to the control grids of said valves and adapted to be connected to the device to be tested.

2. The electric testing arrangement of claim 1, in which the tuned load impedance comprises an anti-resonant circuit tuned to the frequency of the multi-phase system to be tested.

3. The electric testing arrangement of claim 1, in combination with a time-base synchronized by one of the phases of the multi-phase generator and connected to a pair of said deflection plates of said oscilloscope.

4. The electric testing arrangement of claim 1, in combination with a biasing resistance connected to the cathodes of said thermionic valves.

5. The electric testing arrangement of claim 1, in combination with a polarizing source associated with said distributor.

ERIC MALCOLM SWIFT McWHIRTER.
ROLAND HARRIS DUNN.